(12) United States Patent
Ishii

(10) Patent No.: US 8,829,864 B2
(45) Date of Patent: *Sep. 9, 2014

(54) CURRENT DRIVER CIRCUIT

(71) Applicant: Collabo Innovations, Inc., Ottawa (CA)

(72) Inventor: Takuya Ishii, Osaka (JP)

(73) Assignee: Collabo Innovations, Inc., Ottawa ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/798,578

(22) Filed: Mar. 13, 2013

(65) Prior Publication Data

US 2013/0193942 A1 Aug. 1, 2013

Related U.S. Application Data

(63) Continuation of application No. 13/169,571, filed on Jun. 27, 2011, now Pat. No. 8,421,424, which is a continuation of application No. PCT/JP2010/001948, filed on Mar. 18, 2010.

(30) Foreign Application Priority Data

Oct. 1, 2009 (JP) .................................. 2009-229369

(51) Int. Cl.
*G05F 5/00* (2006.01)
*H05B 33/08* (2006.01)
*H02M 3/156* (2006.01)
*G05F 1/10* (2006.01)
*H02M 1/00* (2006.01)

(52) U.S. Cl.
CPC .......... *G05F 1/10* (2013.01); *H02M 2001/0022* (2013.01); *H05B 33/0848* (2013.01); *H05B 33/0815* (2013.01); *H02M 3/156* (2013.01)
USPC .............................. 323/207; 323/222; 363/90

(58) Field of Classification Search
USPC ......... 323/207, 222, 223, 271, 282, 283, 284, 323/285; 363/84, 89, 90, 95, 97
See application file for complete search history.

(56) References Cited

U.S. PATENT DOCUMENTS

| 4,959,606 A | 9/1990 | Forge |
| 5,073,850 A | 12/1991 | Pace |

(Continued)

FOREIGN PATENT DOCUMENTS

| JP | 3-128667 | 5/1991 |
| JP | 8-214541 | 8/1996 |

(Continued)

OTHER PUBLICATIONS

Japan Office Action, mail date is Sep. 24, 2013.

*Primary Examiner* — Nguyen Tran

(74) *Attorney, Agent, or Firm* — Vector IP Law; Robert S. Babayi

(57) ABSTRACT

A current driver circuit includes a converter part having a switching element and converting an input voltage into an output voltage; a current detector which generates a detection signal indicative of the current of the switching element; an input voltage compensating circuit which generates a compensation signal corresponding to the input voltage; a comparator which compares the detection signal and the compensation signal against each other; and a switch driver circuit which generates a drive signal. The drive signal turns the switching element off in accordance with an output of the comparator, and turns the switching element on again after a lapse of a prescribed time from the switching element being turned off.

8 Claims, 5 Drawing Sheets

(56) References Cited

U.S. PATENT DOCUMENTS

| | | | |
|---|---|---|---|
| 5,359,276 A * | 10/1994 | Mammano | 323/207 |
| 5,670,866 A | 9/1997 | Suzuki et al. | |
| 6,667,583 B2 | 12/2003 | Kerenyi | |
| 6,882,551 B2 | 4/2005 | Shimada et al. | |
| 7,397,678 B2 * | 7/2008 | Frank et al. | 363/89 |
| 7,514,912 B2 | 4/2009 | Shao et al. | |
| 7,843,178 B1 | 11/2010 | Houk et al. | |
| 7,898,237 B2 | 3/2011 | Shao et al. | |
| 8,143,866 B2 * | 3/2012 | Fagnani et al. | 323/222 |
| 2004/0263140 A1 | 12/2004 | Adragna et al. | |
| 2006/0261752 A1 | 11/2006 | Lee | |
| 2008/0192514 A1 | 8/2008 | Zhou et al. | |
| 2008/0278972 A1 | 11/2008 | Kimura | |
| 2010/0052627 A1 | 3/2010 | Otsuka et al. | |

FOREIGN PATENT DOCUMENTS

| | | |
|---|---|---|
| JP | 11-252908 | 9/1999 |
| JP | 2003-152224 | 5/2003 |
| JP | 2005-229713 | 8/2005 |
| JP | 2006-325396 | 11/2006 |
| JP | 2007-189004 | 7/2007 |
| JP | 2008-205036 | 9/2008 |
| JP | 2008-283819 | 11/2008 |

* cited by examiner

BOOST STRUCTURE

BUCK STRUCTURE

BUCK STRUCTURE

PRIOR ART

CURRENT DRIVER CIRCUIT

CROSS-REFERENCE TO RELATED APPLICATIONS

This application is a continuation of U.S. patent application Ser. No. 13/169,571, filed on Jun. 27, 2011, which is a continuation application of PCT Application No. PCT/JP2010/001948, filed Mar. 18, 2010, the disclosures of which, are incorporated herein by reference in their entireties

TECHNICAL FIELD

The present invention relates to a current driver circuit that supplies a current to a load such as a light emitting diode (LED) or the like.

BACKGROUND ART

A light emitting diode (LED), which is widely used as a light source of an electronic device in recent years, is characterized in its being low power consumption, having a long service life, and being compact in size. A current driver circuit supplies a forward current that is required to light up such a light emitting element.

In such a conventional current driver circuit, as shown in FIG. 7, a DC-DC converter 2 which converts an input power supply 1 into a DC voltage is used. By connecting the output of the DC-DC converter 2 to a series circuit of LEDs 3 and a current detecting resistor 40, the DC-DC converter 2 is controlled such that a voltage drop at the current detecting resistor 40 caused by the current flowing through the LEDs 3 is stabilized at a prescribed value (see Patent Document 1). In the conventional current driver circuit shown in FIG. 7, the DC-DC converter 2 is structured as a boost converter assuming that an Li-ion battery of about 3.5 V is used as the input power supply 1, and that the LEDs 3 of forward voltage of several V are cascaded to the output.

The DC-DC converter 2 being a boost converter shown in FIG. 7 is structured with: a coil 20 connected to the input power supply 1; a switching element 21 and a diode 22 connected to the other end of the coil 20; an output capacitor 23 connected to a cathode of the diode 22; and a control circuit 24 that controls the drive operation of the switching element 21 to stabilize a feedback voltage Vfb being the voltage of the current detecting resistor 40 at a prescribed value. When the switching element 21 is in an ON state, an input voltage Vi is applied to the coil 20, and a current flows through the coil 20 and energy is stored. Next, when the switching element 21 enters an OFF state, a current that charges the output capacitor 23 flows from the input power supply 1 through via the coil 20 and the diode 22, and the energy stored in the coil 20 is released. By the foregoing operations repeatedly performed, an output voltage Vo is generated in the output capacitor 23, to supply the LEDs 3 with a current Iled.

Assuming that the duty ratio (the proportion of an ON time period in a switching period) of the switching element 21 of the DC-DC converter 2 being a boost converter is D, and ignoring any voltage drop such as in the forward voltage of the diode 22, the relationship between input and output voltages can be represented by the following equation (1):

$$Vo = \frac{Vi}{1-D} \quad (1)$$

The control circuit 24 receives, as a feedback voltage Vfb, a voltage drop in the current detecting resistor 40 which is caused by the supply current Iled flowing into the LEDs 3, and the control circuit 24 drives ON/OFF the switching element 21 while adjusting the duty ratio D of the switching element 21, such that the feedback voltage Vfb attains a prescribed value. By the foregoing operations, the supply current Iled to the LEDs 3 is controlled to be stabilized.

CITATION LIST

Patent Literatures

PLT 1: Japanese Unexamined Patent Application Publication No. 2003-152224
PLT 2: Japanese Unexamined Patent Application Publication No. H3-128667

SUMMARY OF INVENTION

Technical Problem

However, when the conventional current driver circuit of the boost-structure described as above is operated under the input/output condition of a low input and a high output, it disadvantageously becomes difficult to detect the current flowing through the LEDs 3 being a load to stabilize the same to thereby carry out feedback control.

Assuming that the total sum of the forward voltage of the LEDs 3 is Vf; the resistance value of the current detecting resistor 40 is Rs; the inductance of the coil 20 is L; and the capacitance of the output capacitor 23 is C, a transfer function representing an AC fluctuation *Vfb of the feedback voltage Vfb attributed to a duty ratio AC fluctuation *d is represented by the following equation (2):

$$\frac{*Vfb}{*d} = \frac{Vf + Vfb}{1-D} \cdot \frac{1 - \frac{Vfb}{Vf+Vfb} \cdot \frac{sL}{(1-D)^2 Rs}}{1 + \frac{sL}{(1-D)^2 Rs} + \frac{s^2 LC}{(1-D)^2}} \quad (2)$$

The transfer function has the RHP zero $(1+Vf/Vfb)(1-D)^2 Rs/L$ and the second-order pole $(1-D)/\sqrt{(LC)}$, at each of which frequency becomes lower as the duty ratio D becomes greater. That is, the duty ratio D that becomes greater with a lower input and a higher output lowers respective frequencies of the RHP zero and the second-order pole. The second-order pole delays the phase by 180 degrees, whereas the RHP zero increases the gain while delaying the phase by 90 degrees. Therefore, with the feedback system, two zeros are provided around the second-order pole to cancel out. Further, by setting the open-loop gain crossover in a frequency region which is sufficiently lower than the RHP zeros, the gain margin and the phase margin are secured. In a case of a boost converter (and also of a buck-boost converter), when the frequencies of the RHP zeros and the second-order pole are becoming lower, the CR constants used in phase compensation are increased. Additionally, it is inevitable that the transient response performance becomes slow.

In consideration of the foregoing, an object of the present invention is to provide a current driver circuit that is capable of operating stably, without feeding a load current back.

Solution to Problem

In order to achieve the object described above, a current driver circuit according to a first aspect of the present invention includes:

a converter part, which has a switching element, converting an input voltage into an output voltage and supplying a current to a load;

a current detector which generates a detection signal indicating a current of the switching element;

an input voltage compensating circuit which generates a compensation signal corresponding to the input voltage;

a comparator which compares the detection signal with the compensation signal; and a switch driver circuit which generates a drive signal, the drive signal turning the switching element off in accordance with an output of the comparator, and turning the switching element on after a lapse of a prescribed time from the switching element being turned off. The current driver circuit of the present invention thus structured is capable of supplying a stable current to a load, without feeding the load current back.

In a current driver circuit according to a second aspect of the present invention, the converter part according to the first aspect is one of a boost converter and a buck converter, and the switching element of the converter part is configured to be controlled by a control circuit including the input voltage compensating circuit, the comparator, and the switch driver circuit. The current driver circuit of the present invention thus structured can be applied to either one of the boost-structure and buck-structure converters.

In a current driver circuit according to a third aspect of the present invention, the converter part according to the first aspect may be a boost converter, and the input voltage compensating circuit may be configured to generate the compensation signal that becomes lower as the input voltage becomes higher. The current driver circuit of the present invention thus structured is capable of supplying a stable current to a load.

In a current driver circuit according to a fourth aspect of the present invention, the converter part according to the first aspect may be a boost converter, and the input voltage compensating circuit may be configured to generate the compensation signal that is inversely proportional to the input voltage. The current driver circuit of the present invention thus structured is capable of supplying a stable current to a load.

In a current driver circuit according to a fifth aspect of the present invention, the switch driver circuit according to the first aspect may include a latch circuit and a clock circuit, and the latch circuit may be set by a clock signal from the clock circuit and reset by an output of the comparator, and the latch circuit may be configured to have a function of generating the drive signal. The current driver circuit of the present invention thus structured can suppress the effect of fluctuations in the input voltage on the load current.

In a current driver circuit according to a sixth aspect of the present invention, the switch driver circuit according to the first aspect includes a latch circuit and an off-time period timer, and the off-time period timer has a function of starting counting time since when the switching element is turned off, and ending counting time after a lapse of a prescribed time to output a turn-on signal, and the latch circuit is set by the turn-on signal from the off-time period timer and reset by an output of the comparator, the latch circuit having a function of generating the drive signal. The current driver circuit of the present invention thus structured is capable of appropriately setting the OFF time period of the switching element, supplying the load current stably, and carrying out a stable operation even at a high duty ratio. Thus, a highly reliable DC-DC converter can be structured.

In a current driver circuit according to a seventh aspect of the present invention, when the converter part according to the second aspect is the buck converter, a signal of a fixed value independent of the input voltage may be used instead of the compensation signal. The current driver circuit of the present invention thus structured is capable of stably supplying the load current independently of the input voltage.

In a current driver circuit according to an eighth aspect present invention, the control circuit according to the second aspect may be provided with a switching circuit. The switching circuit may be configured to select the compensation signal when the converter part is the boost converter and to select a signal of a fixed value when the converter part is the buck converter, and the switching circuit may be configured to input the selected signal into the comparator which compares the selected signal against the detection signal. The current driver circuit of the present invention thus structured can satisfy the dual-purpose of the boost structure and the buck structure.

In a current driver circuit according to a ninth aspect of the present invention, the control circuit according to the second aspect includes:

an output voltage detecting terminal that receives a detection value of the output voltage;

a selector circuit that causes the switching circuit to select the compensation signal when the detection value received by the output voltage detecting terminal is equal to or more than a first prescribed value, based on that the converter part is the boost converter, and that causes the switching circuit to select the signal of a fixed value when the detection value received by the output voltage detecting terminal is lower than the first prescribed value, based on that the converter part is the buck converter; and an overvoltage protection circuit that stops an operation of the converter part when the detection value received by the output voltage detecting terminal is equal to or more than a second prescribed value. The current driver circuit of the present invention thus structured has an over voltage protection function and has a structure that can satisfy the dual-purpose of the boost structure and the buck structure. Further, it is capable of discerning between the structures automatically.

In a current driver circuit according to a tenth aspect of the present invention, the converter part according to the first aspect may be a buck-boost converter, and the input voltage compensating circuit may be configured to generate the compensation signal that is proportional to a sum of the output voltage of the converter part and the input voltage, and that is inversely proportional to the input voltage. The current driver circuit of the present invention thus structured can supply a stable current to a load without feeding the load current back.

In a current driver circuit according to an eleventh aspect of the present invention, the converter part according to the first aspect is one of a buck-boost converter and a buck converter, the input voltage compensating circuit is configured to generate the compensation signal that is proportional to a sum of the output voltage of the converter part and the input voltage and that is inversely proportional to the input voltage, the current driver circuit further comprising a switching circuit that selects the compensation signal when the converter part is the buck-boost converter, and that selects a signal of a fixed value when the converter part is the buck converter, the switching circuit being configured to input the selected signal into the comparator that compares the selected signal against the detection signal. The current driver circuit of the present invention thus structured is capable of supplying a stable current to a load without feeding the load current back, irrespective of the converter part being the buck-boost converter or the buck converter.

Advantageous Effects of Invention

With the current driver circuit of the present invention, without feeding the load current back, a stable load current can be supplied by controlling the current of the switching element by making a correction based on the input voltage. Further, the structure of the present invention can easily be applied to a boost converter or a buck converter. Still further, because it is capable of discerning between the boost converter and the buck converter using the overvoltage protection function, it is applicable to the both structures of the boost converter and the buck converter. Still further, the current driver circuit of the present invention can also be applied to a buck-boost converter, and is capable of supplying a stable current to a load.

DESCRIPTION OF EMBODIMENTS

Figure 1A:
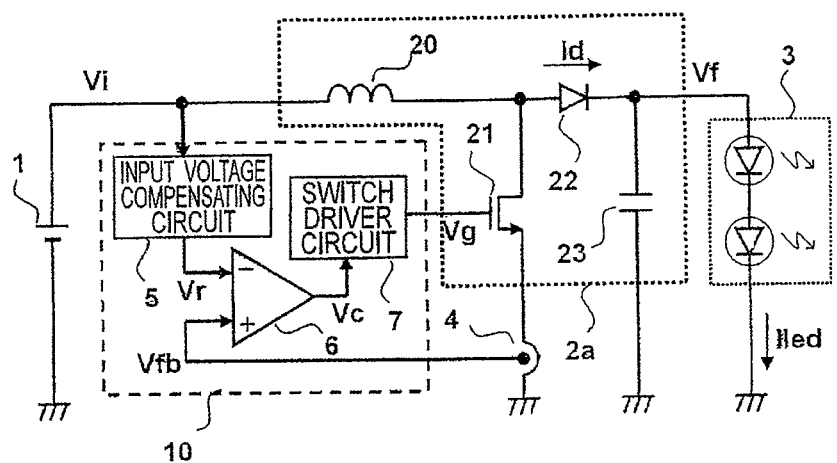
FIG. 1A is a circuit configuration diagram of a current driver circuit according to a first embodiment of the present invention.

In the following, with reference to the accompanying drawings, a description will be given of preferred embodiments of a current driver circuit of the present invention.
First Embodiment First, with reference to FIGS. 1A and 1B, a description will be given of a current driver circuit according to a first embodiment of the present invention. FIG. 1A is a circuit configuration diagram of the current driver circuit according to the first embodiment of the present invention.

In FIG. 1A, reference symbol 1 denotes an input DC power supply such as a battery, which supplies an input DC voltage Vi. Reference symbol 2a denotes a boost converter part being a DC-DC converter, which is structured to include: a coil 20 connected to the input power supply 1; a switching element 21 being an N channel MOSFET and a diode 22, both of which are connected to the other end of the coil 20; and an output capacitor 23 connected to the cathode of the diode 22. Reference symbol 3 denotes LEDs being a load, each of which is connected in parallel to the output capacitor 23. Reference symbol 4 denotes a current detector, which detects a current in the switching element 21 of the boost converter part 2a, to generate a detection voltage Vfb.

Reference symbol 5 is an input voltage compensating circuit, which generates a compensation voltage Vr that becomes lower as the input voltage Vi becomes higher. It is to be noted that the input voltage compensating circuit 5 preferably generates the compensation voltage Vr that is inversely proportional to the input voltage Vi. Reference symbol 6 denotes a comparator, which compares the detection voltage Vfb and the compensation voltage Vr against each other. Reference symbol 7 denotes a switch driver circuit, which causes the switching element 21 to enter an ON state, and thereafter, when a signal from the comparator 6 indicates that the detection voltage Vfb exceeds the compensation voltage Vr, turns off the switching element 21. After a lapse of a prescribed OFF time period, the switch driver circuit 7 again causes the switching element 21 to enter an ON state.

Figure 1B:
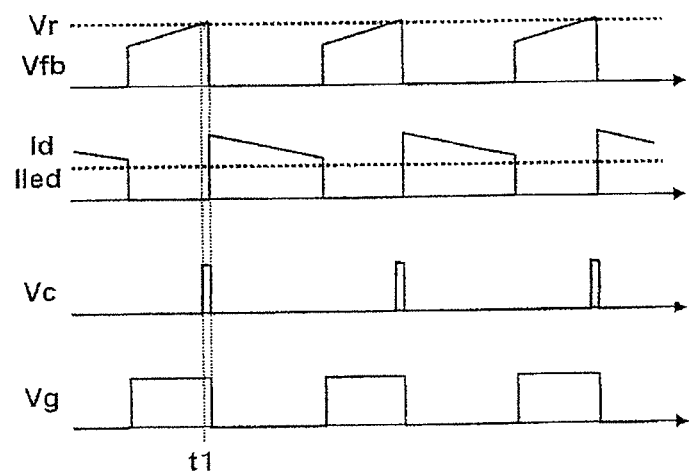
FIG. 1B is an operation waveform diagram of the current driver circuit according to the first embodiment of the present invention.

FIG. 1B is a waveform diagram showing main operations of the current driver circuit according to the first embodiment of the invention shown in FIG. 1A, in which the detection voltage Vfb corresponding to the current in the switching element 21, the compensation voltage Vr, a current Id flowing through the diode 22, a current Iled flowing through the LEDs 3, an output Vc of the comparator 6, and a gate voltage Vg output from the switch driver circuit 7 to the switching element 21 are shown. In the following, with reference to FIGS. 1A and 1B, a description will be given of the operations of the current driver circuit according to the first embodiment of the present invention.

First, when the gate voltage Vg output from the switch driver circuit 7 is "H", the switching element 21 is in an ON state, and the input voltage Vi is applied to the coil 20. At this time, an increasing current flows through the input DC power supply 1→the coil 20→the switching element 21→the current detector 4, to store energy in the coil 20. This current is detected by the current detector 4, and is provided to the positive input terminal of the comparator 6 as the detection voltage Vfb. On the other hand, the negative input terminal of the comparator 6 is provided with the compensation voltage Vr from the input voltage compensation circuit 5. At time point t1 in FIG. 1B, when the increasing detection voltage Vfb exceeds the compensation voltage Vr, the output of the comparator 6 switches from "L" to "H". In response to the change in the output of the comparator 6, the switch driver circuit 7 sets the gate voltage Vg to "L", to turn the switching element 21 off. Because the current ceases flowing through the switching element 21, the detection voltage Vfb falls below the compensation voltage Vr, and the output of the comparator 6 switches from "H" to "L". It is to be noted that the time it takes when the output of the comparator 6 switches through the course of "L"→"H"→"L" varies depending on the response time between the comparator 6 or the switch driver circuit 7 and the switching element 21. In FIG. 1B, the response time of the switch driver circuit 7 is representatively shown. In an OFF state of the switching element 21, the current having been flowing through the coil 20 flows through the input power supply 1→the coil 20→the diode 22→the output capacitor 23 while becoming smaller, and the energy stored in the coil 20 is released. By the foregoing operations repeatedly performed, an output voltage Vo is generated in the output capacitor 23, to supply the LEDs 3 being a load with a current.

Assuming that the duty ratio (the proportion of an ON time period in a switching period) of the switching element 21 of the boost converter part 2a is D, and ignoring any voltage drop such as in the forward voltage of the diode 22, similarly to the conventional example, the relationship between the input and output voltages is represented by equation (1). Further, the current of the LEDs 3 is a direct current which is obtained by averaging the current Id of the diode 22 by the smoothing operation of the output capacitor 23, and is represented by the following equation (3):

$$Iled = \frac{Vi}{Vfl} \cdot \left\{ Ip - \frac{(Vf - Vi) \cdot Toff}{2L} \right\} \quad (3)$$

where Ip is an initial value of the current Id flowing through the diode 22, which is a current peak value of the switching element 21 at an initial time in an OFF period. That is, it is a current peak value of the switching element 21 at an end time in an ON period. Toff is an OFF period of the switching element 21. In the case of the first embodiment, because the output voltage Vo of the boost converter part 2a and the total sum Vf of the forward voltage of the LEDs 3 are equal to each other, they are uniformly represented as Vf.

In equation (3), (Vf−Vi)·Toff/L is a fluctuation range of the coil current. Ignoring it as being sufficiently smaller than the peak value current Ip, the LED current Iled can be adjusted by the peak value current Ip and the input voltage Vi. For example, when the current detector 4 is a resistor having a resistance value Rs, the switching element 21 turns off at a timing where the following relationship is satisfied: Vr=Vfb=Ip×Rs. Accordingly, by setting the compensation voltage Vr such that it becomes lower as the input voltage Vi becomes higher, the LED current Iled can be controlled to be a constant current, on which the effect of fluctuations in the input voltage Vi is suppressed.

In the current driver circuit according to the first embodiment, the boost converter 2a is used as a DC-DC converter. This boost converter part 2a is configured to have its drive operation controlled by a control circuit 10 having the input voltage compensating circuit 5, the comparator 6, and the switch driver circuit 7.

As described above, the current driver circuit according to the first embodiment of the present invention is capable of supplying a stable load current by controlling the current of the switching element 21 by making a correction based on the input voltage, without feeding the load current back.

It is to be noted that, though a description will be given in the following embodiments of the representative structure using a resistor as the current detector 4, the present invention is not limited to a structure in which a resistor is used as the current detector 4, but it is also applicable to any current detector having other structure. For example, it is also possible to structure a current mirror with the switching element 21, to generate a current proportional to a current of the switching element 21, so that the current can be used as a detection signal. In this case, the compensation voltage Vr may be replaced by a compensation current, and the comparator 6 may be structured as a current comparator.

Second Embodiment

Figure 2:
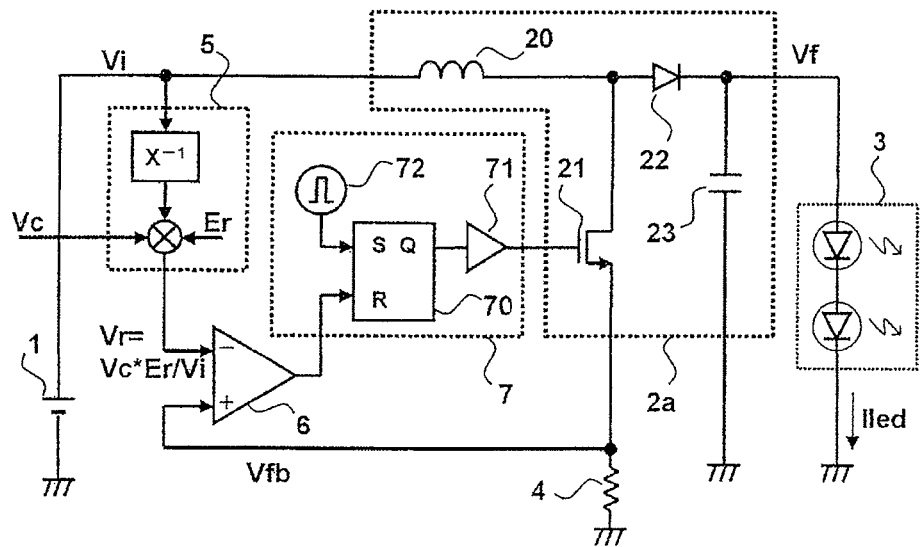
FIG. 2 is a circuit configuration diagram of a current driver circuit according to a second embodiment of the present invention.

FIG. 2 is a circuit configuration diagram of a current driver circuit according to a second embodiment of the present invention. In FIG. 2, those constituents common to those of the current driver circuit according to the first embodiment shown in FIG. 1A are given the same reference numerals, and description thereof is not repeated in the second embodiment, but the description given in the first embodiment is applied thereto. The current driver circuit according to the second embodiment is different from the current driver circuit according to the first embodiment shown in FIG. 1A in that the structure of the input voltage compensating circuit 5 and that of the switch driver circuit 7 are more detailed, and basic operations are the same as in the first embodiment. Accordingly, in the following second embodiment, a description will be given of the structure and operations of the input voltage compensating circuit 5 and the switch driver circuit 7.

In FIG. 2, the input voltage compensating circuit 5 generates a compensation voltage Vr=Vc×Er/Vi, which is obtained by dividing a product of a control voltage Vc that is applied from, e.g., an external source, and an internal reference voltage Er, by an input voltage Vi. Such a computing circuit may be structured by using a commonly used analog multiplier circuit such as a Gilbert multiplier, or may be structured as a digital circuit.

The switch driver circuit 7 is structured to include an SR latch circuit 70, a buffer 71 that amplifies electric power of the output of the SR latch circuit 70 to provide the gate voltage Vg of the switching element 21, and a clock circuit 72 that outputs the pulse of a prescribed frequency. The SR latch circuit 70 being set by the output pulse of the clock circuit 72 outputs "H", to thereby cause the switching element 21 to enter an ON state, via the buffer 71. With the switching element 21 in the ON state, the current increases, and the detection voltage Vfb rises. When the detection voltage Vfb exceeds the compensation voltage Vr, the output of the comparator 6 becomes "H", to reset the SR latch circuit 70. The SR latch circuit 70 being reset outputs "L", to thereby cause the switching element 21 to enter an OFF state, via the buffer 71.

As described above, the current driver circuit according to the second embodiment is fixed-frequency, and operates such that the current peak value of the switching element 21 is inversely proportional to the input voltage Vi. With the current driver circuit according to the second embodiment thus structured, the switching frequency is fixed, and the LED current Iled can be controlled to be a constant current, on which the effect of fluctuations in the input voltage Vi is suppressed.

It is to be noted that, though the description has been given of the current driver circuit according to the second embodiment shown in FIG. 2 in connection with the switch driver circuit 7 whose switching frequency is fixed, it may be structured having the OFF time period of the switching element 21 fixed. As in the current driver circuit of the present invention, the scheme in which the current peak value of the switching element 21 is controlled is the current mode control. It is known that, with the fixed frequency type, a high duty ratio invites an unstable operation called subharmonic oscillation. In order to avoid the subharmonic oscillation, it is necessary to add a compensation circuit that is called a slope compensation. However, with the variable-frequency type such as the fixed-OFF time period, the subharmonic oscillation does not occur, and the slope compensation circuit can be dispensed with.

Figure 3:
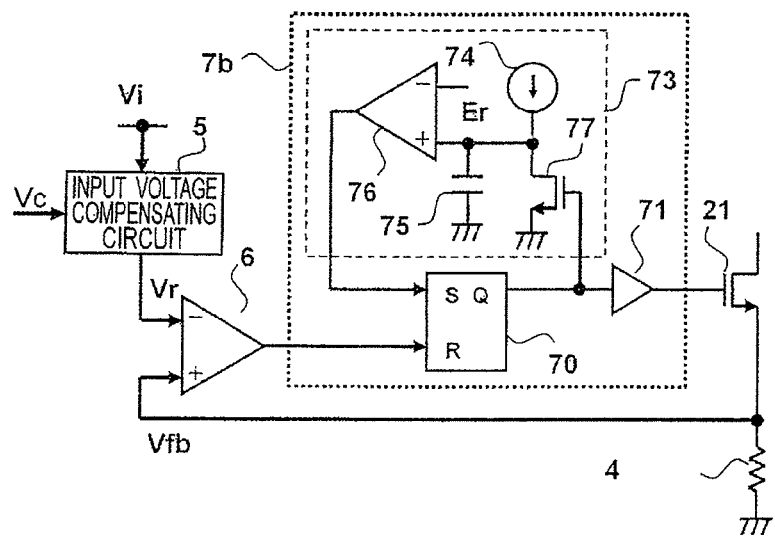
FIG. 3 is a circuit configuration diagram showing another structure of the current driver circuit according to the second embodiment.

FIG. 3 shows one exemplary structure of a current driver circuit having a switch driver circuit 7b of such a fixed-OFF time period type. In FIG. 3, reference symbol 73 denotes an off-time period timer, which replaces the clock circuit 72 in the switch driver circuit 7 shown in FIG. 2. In the off-time period timer 73, the current of a constant current source circuit 74 charges a capacitor 75, and a comparator 76 compares the charge voltage of the capacitor 75 and the reference voltage Er against each other. The output of the comparator 76 sets the SR latch circuit 70, and when ON, a FET 77 enters a connected state, causing a short-circuit discharge of the capacitor 75. The output of the SR latch circuit 70 is supplied to the gate voltage of the FET 77. In the following, this operation is described.

When the switching element 21 is in an ON state, that is, when the output of the SR latch circuit 70 is "H", the FET 77 is also in an ON state, causing the short-circuit discharge of the capacitor 75. On the other hand, when the switching element 21 is in an OFF state, the FET 77 is also in an OFF state. At this time, the current of the constant current source circuit 74 charges the capacitor 75, and the voltage of the capacitor 75 rises. When the charge voltage of the capacitor 75 exceeds the reference voltage Er, the comparator 76 outputs "H", to thereby set the SR latch circuit 70. The SR latch circuit 70 being set outputs "H", causing the switching element 21 to enter an ON state. As in the foregoing operation, the off-time period timer 73 based on the use of charging time of the capacitor 75 sets a prescribed OFF time period, whereby it becomes possible to structure a current driver circuit having the switch driver circuit 7b of the fixed-OFF time period type, which does not require the slope compensation circuit.

In the current driver circuit according to the second embodiment, the boost converter 2a is used as a DC-DC converter. The boost converter part 2a is configured to have its drive operation controlled by the control circuit 10 having the input voltage compensating circuit 5, the comparator 6, and the switch driver circuit 7 or 7b.

Third Embodiment

Though the description has been given of the current driver circuits according to the first and second embodiments in the case where the boost converter is used as the DC-DC converter, the current driver circuit of the present invention can provide a structure applicable to both the boost- and buck-DC-DC converters, which share the comparator 6 and the switch driver circuit 7.

Figure 4A:
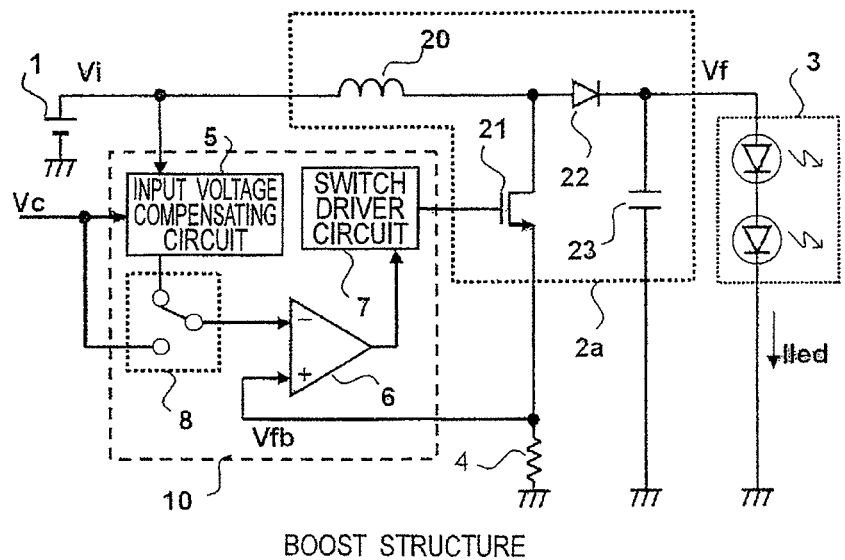
FIG. 4A is a circuit configuration diagram of a boost-structure current driver circuit according to a third embodiment of the present invention.
Figure 4B:
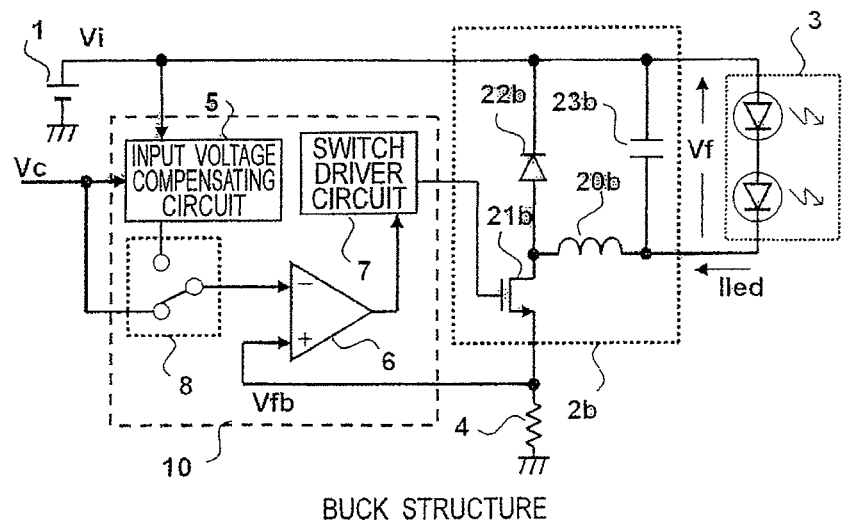
FIG. 4-B is a circuit configuration diagram of a buck-structure current driver circuit according to the third embodiment of the present invention.

FIGS. 4A and 4B are circuit configuration diagrams of a current driver circuit according to a third embodiment of the present invention, the former showing the boost structure and the latter showing the buck structure. In FIG. 4A, those constituents common to those of the current driver circuit according to the first embodiment shown in FIG. 1A are given the same reference numerals, and description thereof is not repeated. The current driver circuit shown in FIG. 4A is different from the structure of the current driver circuit shown in FIG. 1A in being provided with a switching circuit 8, which selects one of the control voltage Vc from an external source and the output of the input voltage compensating circuit 5, as the applied voltage Vr to the negative input terminal of the comparator 6. Further, in the structure of the third embodiment, when the switching circuit 8 selects the output of the input voltage compensating circuit 5 as the applied voltage Vr to the negative input terminal of the comparator 6, substantially the same structure as that of the current driver circuit according to the first embodiment shown in FIG. 1A is obtained.

On the other hand, as shown in FIG. 4B, when the switching circuit 8 selects the control voltage Vc as the applied voltage Vr to the negative input terminal of the comparator 6, the peak value of the current flowing through the switching element 21b is given as: Ip=Vc/Rs, which is not dependent on the input voltage Vi. Further, as compared to the current driver circuit according to the first embodiment shown in FIG. 1A, the circuit structure shown in FIG. 4B has, in addition to the added switching circuit 8, the DC-DC converter structured as a buck converter 2b. In the following, a brief description will be given of the operations of the buck structure.

First, when the switching element 21b is in an ON state, a coil 20b is applied with a differential voltage (Vi−Vf) between the input voltage Vi and the total sum Vf of the forward voltage of the LEDs 3 being a load. At this time, an increasing current flows through the input DC power supply 1→the output capacitor 23b→the coil 20b→the switching element 21b→the current detector 4, to store energy in the coil 20b. This current is detected by the current detector 4, and is applied to the positive input terminal of the comparator 6 as the detection voltage Vfb. When the increasing detection voltage Vfb exceeds the control voltage Vc, the output of the comparator 6 switches from "L" to "H", and the switch driver circuit 7 turns the switching element 21b off. In an OFF state of the switching element 21b, the current having been flowing through the coil 20b flows through the diode 22b the output capacitor 23b→the coil 20b while becoming smaller, and the energy stored in the coil 20b is released. By the foregoing operations repeatedly performed, an output voltage Vf is generated in the output capacitor 23b, to supply the LEDs 3 being a load with a current Iled.

Assuming that the duty ratio (the proportion of an ON time period in a switching period) of the switching element 21b of the buck converter part 2b is D, and ignoring any voltage drop such as in the forward voltage of the diode 22b, the relationship between the input and output voltages is represented by Vf=D×Vi. The current Iled of the LEDs 3 is a direct current which is obtained by averaging the current flowing through the coil 20b by the output capacitor 23b, and is represented by the following equation (4):

$$Iled = Ip - \frac{Vf \cdot Toff}{2L} \qquad (4)$$

where Ip is an initial value of the current Id, which is a current peak value of the switching element 21b at an initial time in an OFF period. That is, it is a current peak value of the switching element 21b at an end time in an ON period. Toff is an OFF period of the switching element 21b. In the third embodiment also, similarly to the first and second embodiments, because the output voltage of the buck converter part 2b is equal to the total sum Vf of the forward voltage of the LEDs 3, they are uniformly represented as Vf.

In equation (4), Vf·Toff/L is a fluctuation range of the coil current, which becomes fixed when the OFF time period Toff is fixed. Accordingly, the LED current Iled can be adjusted by the peak value current Ip=Vc/Rs.

It is to be noted that the fluctuation in the current flowing through the coil 20b follows the switching frequency of high frequency, and does not affect the luminance or tone of the LEDs 3. Therefore, the output capacitor 23b can be omitted from the structure.

Further, with the buck structure, for the purpose of reducing current consumption, the input voltage compensating circuit 5 which is unnecessary should be placed in a standby state.

It is to be noted that, the current driver circuit according to the third embodiment is of the dual-purpose type in which either one of the boost converter part 2a and the buck converter part 2b is used as the DC-DC converter. The DC-DC converter is configured to have its drive operation controlled by the control circuit 10 having the input voltage compensating circuit 5, the comparator 6, the switch driver circuit 7, and the switching circuit 8.

Fourth Embodiment

Figure 5A:
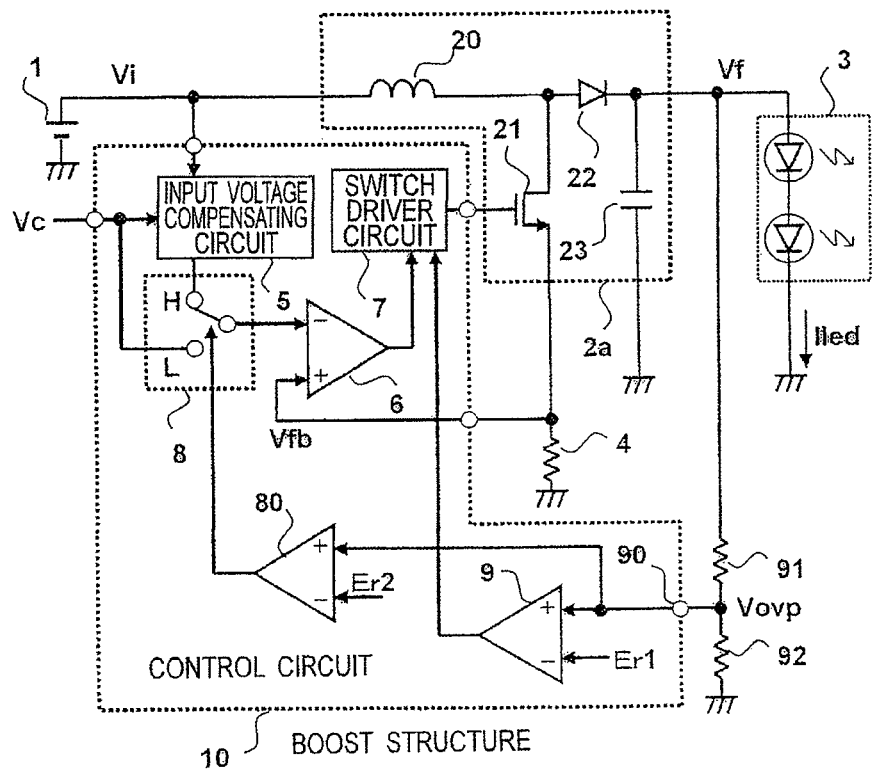
FIG. 5A is a circuit configuration diagram of a boost-structure current driver circuit according to a fourth embodiment of the present invention.
Figure 5B:
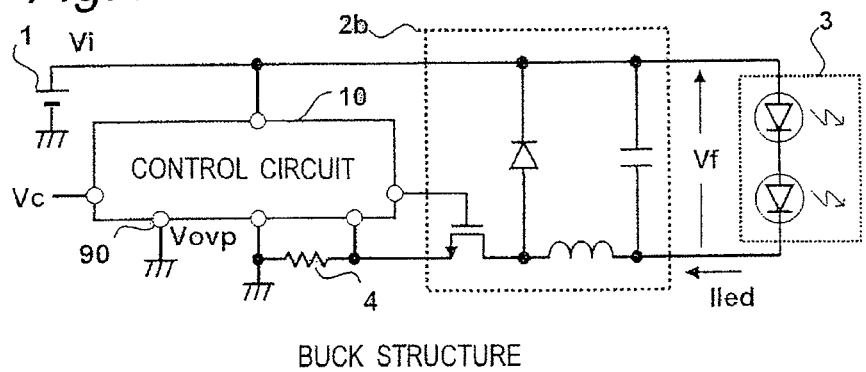
FIG. 5B is a circuit configuration diagram of a buck-structure current driver circuit according to the fourth embodiment of the present invention.

A current driver circuit according to a fourth embodiment of the present invention is configured such that the control circuit that controls the drive operation of the DC-DC converter determines whether the DC-DC converter is a boost converter or a buck converter, and exerts control as appropriate. FIG. 5A is a circuit configuration diagram in which, in the current driver circuit according to the fourth embodiment, the boost converter part 2a is controlled by the control circuit 10, whereas FIG. 5B is a circuit configuration diagram in which the buck converter part 2b is controlled by the control circuit 10. In FIG. 5A, those constituents common to those of the current driver circuit according to the third embodiment shown in FIG. 4A are given the same reference numerals, and description thereof is not repeated. The current driver circuit according to the fourth embodiment is different from the structure of the current driver circuit according to the third embodiment shown in FIG. 4A in that an overvoltage protection circuit is provided, and the overvoltage protection circuit is used for discerning between the boost structure and the buck structure. In the following, a description will be given of the overvoltage protection operation and the discerning operation between the boost structure and the buck structure.

In FIG. 5A, the resistor 91 and the resistor 92 form a detecting resistor that divides the total sum Vf of the forward voltage of the LEDs 3. The detecting resistor provides a detection value Vovp to the positive input terminal of a comparator 9 being an overvoltage protection circuit. In the comparator 9, the detection value Vovp is compared against a first reference voltage Er1. In a normal operation, the detection value Vovp is set so as not to exceed the first reference voltage Er1. When any LED 3 is open, or damaged in an open state, the current Iled ceases flowing, and the output of the boost converter part 2a, that is, the total sum Vf of the forward voltage of the LEDs 3, abnormally increases. By the detection value Vovp exceeding the first reference voltage Er1 to cause the comparator 9 to output "H", the abnormal increase in the output is detected. This signal is transmitted to the switch driver circuit 7, to thereby cause the switching element 21 to enter an OFF state. The foregoing is the overvoltage protection operation.

On the other hand, in the current driver circuit according to the fourth embodiment, the discerning operation by the control circuit 10 as to whether the controlled DC-DC converter is of the boost-structure or of the buck-structure is carried out in the following manner.

The detection value Vovp detected by the detecting resistor of the resistor 91 and the resistor 92 is compared by the comparator 80 being a selector circuit against a second reference voltage Er2. The second reference voltage Er2 is previously set to be lower than the value obtained by dividing the minimum rated value of the input voltage Vi by the resistor 91 and the resistor 92. By setting the second reference voltage Er2 in the manner described above, the current driver circuit of the boost structure always satisfies the relationship Vovp>Er2 once actuated. Therefore, the comparator 80 outputs "H". That is, the control circuit 10 determines that it is the boost-structure based on the output "H" of the comparator 80, and causes the switching circuit 8 to select such that the output of the input voltage compensating circuit 5 is provided to the negative input terminal of the comparator 6.

As described in the foregoing, the control circuit 10 includes at least the input voltage compensating circuit 5, the comparator 6, the switch driver circuit 7, the switching circuit 8, the comparator 9 as the overvoltage protection circuit, and the comparator 80 as the selector circuit. FIG. 5B is a circuit diagram of the buck structure, in which a buck converter is provided as the DC-DC converter in the current driver circuit using the control circuit 10 shown in FIG. 5A. The control circuit 10 is provided with the comparator 9 as the voltage protection circuit, and an output voltage detecting terminal 90 to which a detection value Vovp is applied, which is to be provided to the comparator 80 as the selector circuit that discerns between boost and buck.

In the current driver circuit, with the boost structure which outputs a voltage higher than the input voltage Vi, there is a possible danger of occurrence of an overvoltage in the event of, e.g., any open LED. Therefore, the overvoltage protection function is essential. However, with the buck structure which does not reach a voltage equal to or higher than the input voltage Vi even in an abnormal mode, it is determined that the overvoltage protection function can be dispensed with, and the output voltage detecting terminal 90 is previously grounded. Such a structure always satisfies the relationship Vovp<Er2, and therefore, the comparator 80 outputs "L". That is, the control circuit 10 determines that it is the buck structure based on the output "L" of the comparator 80, and causes the switching circuit 8 to select such that the control voltage Vc is provided to the negative input terminal of the comparator 6.

As described in the foregoing, in the structure of the current driver circuit according to the fourth embodiment, based on the use of the presence or absence of the overvoltage protection function, when the control circuit 10 is integrated into the circuitry, it becomes possible to discern between the boost structure and the buck structure, without inviting an increase in the number of terminals.

Fifth Embodiment

Figure 6:
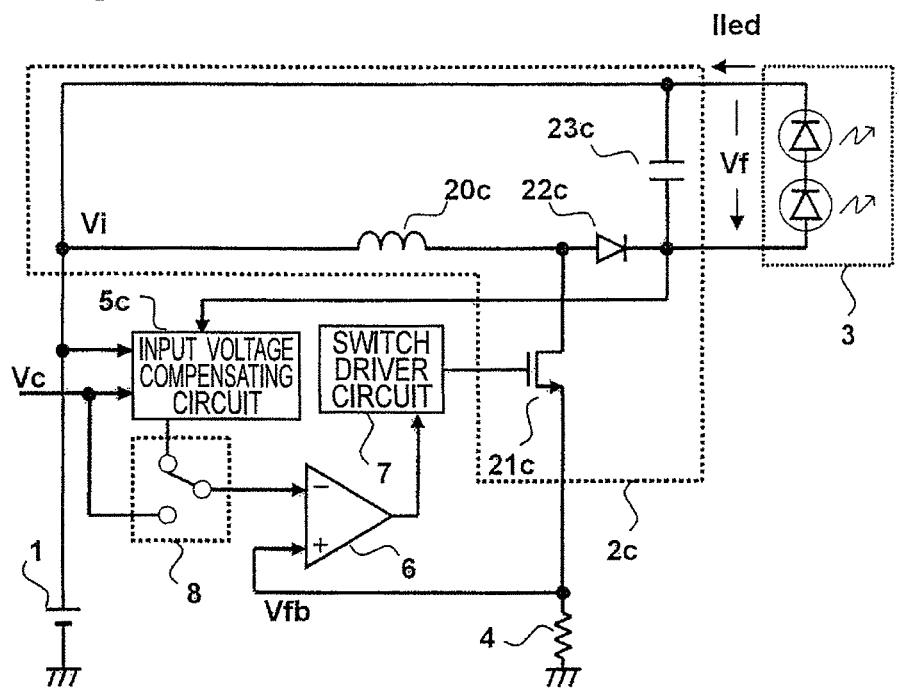
FIG. 6 is a circuit configuration diagram of a current driver circuit according to a fifth embodiment of the present invention.
Figure 7:
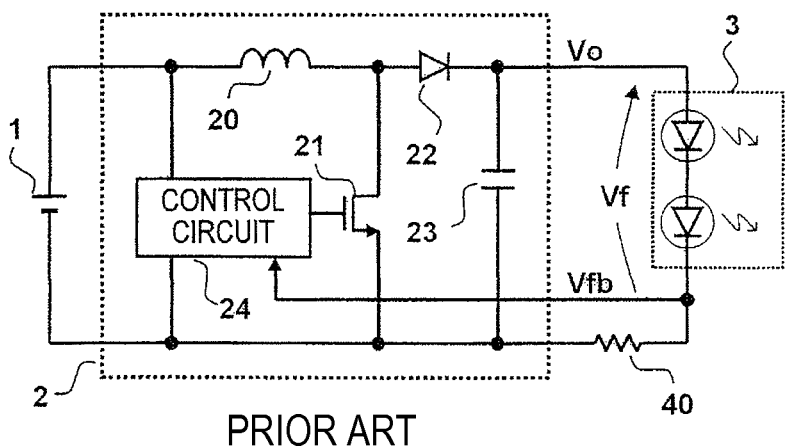
FIG. 7 is the circuit configuration diagram of the conventional current driver circuit.

In the foregoing first to fourth embodiments, the description has been given of the boost structure and the buck structure. However, it goes without saying that the current driver circuit of the present invention is also applicable to a buck-boost structure. FIG. 6 is a circuit configuration diagram of a current driver circuit according to a fifth embodiment of the present invention. In FIG. 6, those constituents common to those of the current driver circuit according to the third embodiment shown in FIG. 4A are given the same reference numerals, and description thereof is not repeated. The current driver circuit according to the fifth embodiment is different from the structure of the current driver circuit according to the third embodiment shown in FIG. 4A in that the boost converter part 2a and the input voltage compensating circuit 5 in FIG. 4A are replaced by a buck-boost converter part 2c and an input voltage compensating circuit 5c. Then, the buck-boost converter part 2c is different from the boost converter part 2a shown in FIG. 4A in that a node connecting between the low-potential side of the output capacitor 23c and the low-potential side of the LEDs 3 is connected to the high-potential side of the input DC power supply 1.

In the following, a description will be given of the operations of the current driver circuit of the buck-boost structure according to the fifth embodiment shown in FIG. 6.

First, when a switching element 21c is in an ON state, the input voltage Vi is applied to a coil 20c. At this time, an increasing current flows through the input DC power supply 1→the coil 20c→the switching element 21c→the current detector 4, to store energy in the coil 20c. This current is detected by the current detector 4, and is applied to the positive input terminal of the comparator 6 as the detection voltage Vfb. When the increasing detection voltage Vfb exceeds the output Vr of the input voltage compensating circuit 5c selected by the switching circuit 8, the output of the comparator 6 switches from "L" to "H", and the switch driver circuit 7 turns the switching element 21c off. In an OFF state of the switching element 21c, the current having been flowing through the coil 20c flows through the diode 22c→the output capacitor 23c→the coil 20c while becoming smaller, and the energy stored in the coil 20c is released. By the foregoing operations repeatedly performed, an output voltage Vf is generated in the output capacitor 23c, to supply the LEDs 3 being a load with a current Iled.

Assuming that the duty ratio (the proportion of an ON time period in a switching period) of the switching element 21c of the buck-boost converter part 2c is D, and ignoring any voltage drop such as in the forward voltage diode 22c, the relationship between the input and output voltages is represented by Vf=D/(1−D)×Vi. The current Iled of the LEDs 3 is a direct current which is obtained by averaging the current flowing through the diode 22c by the output capacitor 23c, and is represented by the following equation (5):

$$Iled = \frac{Vi}{Vi+Vf} \cdot \left(Ip - \frac{Vf \cdot Toff}{2L}\right) \quad (5)$$

where Ip is an initial value of the current Id, which is a current peak value of the switching element 21c at an initial time in an OFF period. That is, it is a current peak value at an end time in an ON period. Toff is an OFF period of the switching element 21c. In equation (5), Vf·Toff/L is a fluctuation range of the coil current, and this fluctuation range value of the coil current becomes fixed when the OFF time period Toff is fixed. Accordingly, the input voltage compensating circuit 5c further detects a sum voltage (Vi+Vf) of the input voltage Vi and the total sum Vf of the LED forward voltage, and compensating for the output Vr such that it becomes proportional to (Vi+Vf)/Vi. In this manner, the LED current Iled is allowed to be constant by the peak value current Ip=Vr/Rs.

As described above, in the current driver circuit according to the fifth embodiment, it is configured such that: the DC-DC converter is the buck-boost converter 2c; and the input voltage compensating circuit 5c generates the compensation signal Vr that is proportional to the sum of the output voltage of the buck-boost converter 2c and the input voltage and that is inversely proportional to the input voltage. The current driver circuit according to the fifth embodiment thus structured is also capable of supplying a stable current to a load, without feeding the load current back.

It is to be noted that the current driver circuit according to the fifth embodiment is applicable to either one of the buck-boost converter and the buck converter as the DC-DC converter. In such cases also, the input voltage compensating circuit 5c is configured to generate the compensation signal Vr that is proportional to the sum of the output voltage Vf of the DC-DC converter and the input voltage Vi, and is inversely proportional to the input voltage Vi. In the current driver circuit thus structured, the switching circuit 8 selects the compensation signal Vr when the DC-DC converter is the buck-boost converter, and selects the signal of the fixed value Vc when the DC-DC converter is the buck converter. The switching circuit 8 inputs the selected signal into the comparator 6 that compares the selected signal against the detection signal Vfb. The current driver circuit according to the fifth embodiment thus structured is capable of supplying a stable current to a load irrespective of whether the converter part is the buck-boost converter or the buck converter, without feeding the load current back.

Further, the current driver circuit of the present invention is applicable to any converter of boost, buck, or buck-boost structure as the DC-DC converter. In such cases, a switch pin may be provided to the current driver circuit that would achieve a structure of the control circuit corresponding to the boost, buck, or buck-boost structure. Thus, upon application of any converter, the switch pin can be operated so as to address the converter.

Although the description has been chiefly given of the switch driver circuit 7 of the fixed-frequency type structure in each of the foregoing embodiments, the present invention may employ the switch driver circuit 7b of the fixed-OFF time period & variable-frequency type, as shown in FIG. 3. In this manner, it becomes possible to structure the current driver circuit with which occurrence of subharmonic oscillation is prevented and which is highly reliable, even at a high duty ratio.

Industrial Applicability

As has been described in the foregoing, the present invention is useful for a current driver circuit that supplies a stable direct current to a load such as LEDs used for electronic devices.

What is claimed is:

1. A current driver circuit connected to an input power supply having terminal inputting a direct current voltage, comprising:
   a converter part, which has a switching element, converting direct current voltage into an output voltage and supplying a current to a load;
   a current detector which generates a detection signal indicating a current of the switching element;
   an input voltage compensating circuit directly connected to the input power supply, wherein the input voltage compensating circuit inputs the direct current voltage and generates a compensation signal obtained by dividing a product of a control voltage and an internal reference voltage, by the input voltage;
   a comparator which compares the detection signal with the compensation signal; and
   a switch driver circuit which generates a drive signal, the drive signal turning the switching element off in accordance with an output of the comparator, and turning the switching element on after a lapse of a prescribed time from the switching element being turned off, wherein:
   the converter part is a boost converter, and
   the input voltage compensating circuit is configured to generate the compensation signal that becomes lower as the input voltage becomes higher.

2. The current driver circuit according to claim 1, wherein:
   the converter part is a boost converter, and
   the input voltage compensating circuit is configured to generate the compensation signal that is inversely proportional to the input voltage.

3. The current driver circuit according to claim 1, wherein:
   the switch driver circuit includes a latch circuit and a clock circuit, and
   the latch circuit is set by a clock signal from the clock circuit and reset by an output of the comparator, the latch circuit having a function of generating the drive signal.

4. The current driver circuit according to claim 1, wherein:
   the switch driver circuit includes a latch circuit and an off-time period timer, and
   the off-time period timer has a function of starting counting time since when the switching element is turned off, and ending counting time after a lapse of a prescribed time to output a turn-on signal, and the latch circuit is set by the turn-on signal from the off-time period timer and reset by an output of the comparator, the latch circuit having a function of generating the drive signal.

5. A current driver circuit connected to an input power supply configured to input a direct current voltage as an input voltage, comprising:

a buck-boost converter, which has a switching element, converting an input voltage into an output voltage and supplying a current to a load;

a current detector which generates a detection signal indicating a current of the switching element;

an input voltage compensating circuit directly connected to the input power supply and which inputs the direct current voltage generates a compensation signal obtained by dividing a product of a control voltage and an internal reference voltage, by the input voltage, and said compensation signal becomes lower as the input voltage becomes higher;

a comparator which compares the detection signal with the compensation signal; and a switch driver circuit which generates a drive signal, the drive signal turning the switching element off in accordance with an output of the comparator, and turning the switching element on after a lapse of a prescribed time from the switching element being turned off.

6. The current driver circuit according to claim 5, wherein the input voltage compensating circuit is configured to generate the compensation signal that is proportional to a sum of the output voltage of the converter part and the input voltage, and that is inversely proportional to the input voltage.

7. A current driver circuit, comprising:

an input power supply having a terminal inputting a direct current voltage;

a converter part, which has a switching element, converting direct current voltage into an output voltage and supplying a current to a load;

a current detector which generates a detection signal indicating a current of the switching element;

an input voltage compensating circuit directly connected to the input power supply, wherein the input voltage compensating circuit inputs the direct current voltage and generates a compensation signal obtained by dividing a product of a control voltage and an internal reference voltage, by the input voltage;

a comparator which compares the detection signal with the compensation signal; and a switch driver circuit which generates a drive signal, the drive signal turning the switching element off in accordance with an output of the comparator, and turning the switching element on after a lapse of a prescribed time from the switching element being turned off, wherein the converter part is a boost converter, and the input voltage compensating circuit is configured to generate the compensation signal that becomes lower as the input voltage becomes higher.

8. A current driver circuit, comprising:

an input power supply configured to input a direct current voltage as an input voltage;

a buck-boost converter, which has a switching element, converting the input voltage into an output voltage and supplying a current to a load;

a current detector which generates a detection signal indicating a current of the switching element;

an input voltage compensating circuit directly connected to the input power supply and which inputs the direct current voltage and generates a compensation signal obtained by dividing a product of a control voltage and an internal reference voltage, by the input voltage, and said compensation signal becomes lower as the input voltage becomes higher;

a comparator which compares the detection signal with the compensation signal; and a switch driver circuit which generates a drive signal, the drive signal turning the switching element off in accordance with an output of the comparator, and turning the switching element on after a lapse of a prescribed time from the switching element being turned off.

\* \* \* \* \*